United States Patent Office 3,640,936
Patented Feb. 8, 1972

3,640,936
WET STRENGTH RESINS
Laurence Lyman Williams, Stamford, Conn., assignor to American Cyanamid Company, Stamford, Conn.
No Drawing. Filed May 5, 1969, Ser. No. 821,949
Int. Cl. C08f 27/14, 29/00
U.S. Cl. 260—29.6 HN            7 Claims

ABSTRACT OF THE DISCLOSURE

A water-soluble thermosetting polymer of high cationic density and a decreased number of ethylene cross-linkages is prepared by reacting polyacrylonitrile with ethylenediamine to form polyvinylimidazoline, hydrating the polyvinylimidazoline, and reacting the hydration product with epichlorohydrin.

The polymer at low molecular weight is a wet-strength resin for paper and at high molecular weight is a flocculating agent for solids suspended in water and a drainage aid in the manufacture of paper.

---

The present invention relates to a cationic water-soluble thermosetting vinyl polymer of high cationic density and to processes for the manufacture thereof.

The water-soluble polymer which is largely composed of unsubstituted acrylamide and (2-amino-ethyl) acrylamide linkages of the respective theoretical configurations

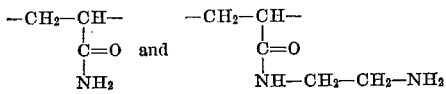

is known. It is further known that after reaction with epichlorohydrin the polymer is useful for imparting wet strength to paper, for flocculating the solids in sewage and mine effluents, and for improving the affinity of cellophane film for hydrophobic organic material. The polymer is made by transamidating polyacrylamide with ethylenediamine and ethylenediamine is difunctional. One disadvantage of the process is that the polymer contains a substantial number of cross-linkages (formed by condensation of ethylenediamine with two amide substituents), so that the polymer reaches the gel state at lower molecular weight (and therefore lower cationic density) than would otherwise be the case.

The discovery has now been made that a polymer which is substantially free from the aforementioned drawbacks can be prepared by a process which consists essentially in the partial or complete hydrolysis of polyvinylimidazoline or a water-soluble cationic polymer at least 80 mol percent composed of

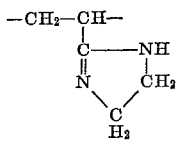

linkages, and the conversion of the hydrolysis product to water-soluble thermosetting form by reaction with epichlorohydrin. The polymer consists essentially of the reaction product of a vinyl polymer consisting essentially of

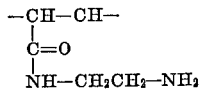

linkages with epichlorohydrin.

In preferred embodiments the invention possesses the following advantages:

(1) The polymer contains substantially no amide to amide ethylene cross-linkages. As a result, substantially all of the substituents of the polymer are cationic.

(2) Substantially every substituent of the polymer is reactive and functions in the thermosetting reaction. As a result, the polymer possesses excellent efficiency as wet strengthening agent.

(3) Before reaction with epichlorohydrin the polymer is substantially free from cross-linkages. As a result the polymer is water-soluble even when of ultra high molecular weight and such polymer is specially adapted for use as flocculant.

(4) The polymer after reaction with epichlorohydrin is substantively adsorbed by cellulose papermaking fibers and thermosets rapidly and substantially completely at low temperatures over a broad alkaline and acid pH range. As a result, the polymer can be used in the commercial manufacture of paper without requiring alteration in the operation of the papermaking machine.

(5) The starting polyvinylimidazoline can be prepared by reacting polyacrylonitrile with ethylenediamine. The reaction is a simple one. The invention therefore provides a simple method for converting polyacrylonitrile into a water-soluble cationic thermosetting polymer.

A useful product is obtained regardless of the molecular weight of the starting polyvinylimidazoline. However, we prefer the molecular weight of the material to be outside (i.e., on either side) of the molecular weight range of 100,000–1,000,000. Products prepared from polyvinylimidazoline having a molecular weight below 100,000 are more storage-stable yet are well suited for use as wet strength agents in the manufacture of paper than products prepared from polyvinylimidazoline of higher molecular weight. Products prepared from polyvinylimidazoline having a molecular weight above 1,000,000 and preferably at the verge of gelation are very efficient as flocculants in sewage.

In the process, the hydrolysis step occurs automatically when a dilute (e.g. 10%–25%) solution of the polyvinylimidazoline in water is allowed to stand at moderately elevated temperature (e.g. 60° C.–80° C.). The hydrolysis is substantially complete in 5–10 hours. No adjustment of the pH is needed.

If desired, the course of the hydrolysis can be followed by infra-red spectroscopy. A satisfactory product is obtained when more than ¾ of the imidazoline substituents have hydrolyzed (as measured by approximately 75% disappearance of the C=N band) but preferably the reaction is allowed to run to complete as this provides a product of highest wet strengthening efficiency.

The reaction with epichlorohydrin is performed by adding the requisite amount of epichlorohydrin to a dilute (e.g. 10%–25% by weight) solution of the hydrolyzed polyvinylimidazoline in water at about 50° C.–100° C. and stirring the mixture until the viscosity of the solution at 20% solids and 25° C. is at least C on the Gardner-Holdt scale. No pH control is necessary, but the reaction proceeds more rapidly towards its end when alkali is added as acid acceptor to prevent the pH from dropping below about 7. A polymer of greatest effectiveness is obtained when the reaction is carried to the point of incipient gelation (as determined by a pilot run). The reaction is substantially stopped by cooling the reaction mixture, diluting to 5%–15% solids with water and strongly acidifying.

The amount of epichlorohydrin which is reacted with the polyvinylimidazoline is at least that which is sufficient to form a polymer which rapidly thermosets but is not so much that it converts the polymer into a water-insoluble gel either immediately or after a short storage period. No more than 2 mols of epichlorohydrin should be added per basic amino nitrogen atom present.

A polymer of best cationic and wet-strengthening properties is generally obtained when the amount of epichlorohydrin is between 1.3 and 1.8 mols per basic amino nitrogen atom present. A polymer of satisfactory thermosetting properties is obtained when a film of a solution of the polymer at pH 6-8 yields a water-insoluble film when heated on a glass plate for one minute at 90° C.

The final solution may be used without aging. For storage it is advantageously diluted to about 10% solids with water, adjusted to pH 3-5 by addition of hydrochloric acid, and maintain at low temperature.

When starting with polyacrylonitrile, a fluid slurry of ethylenediamine in excess and finely-ground polyacrylonitrile is heated in an open vessel at 90° C. to reflux (or at a higher temperature in an autoclave) until at least 80% and preferably all of the nitrile substituents have been converted to imidazoline substituents, so that the product is water-soluble. Unreacted ethylenediamine is extracted by use of benzene, hexane or other inert and preferably volatile selective solvent which can be stripped off permitting the residual ethylenediamine to be reused. The reaction has no significant effect upon the length of the vinyl chains.

If desired, a volatile aliphatic alcohol may be added along with the ethylenediamine to decrease the viscosity of the reaction mixture and facilitate stirring and heat transfer.

Advantageously heating is continued until all of the polyacrylonitrile has dissolved and a clear solution is obtained, which shows that substantially all of the nitrile substituents have been converted to imidazoline substituents.

The boiling point of ethylenediamine is 116° C. Most of the unreacted ethylenediamine present can consequently be recovered by distillation or drum drying.

In the process, ethylenediamine is critical. Other polyamines such as 1,3-propanediamine produce imidazoline-type linkages in poor yield, as do mono-primary-mono-secondary amines. Polyalkylenepolyamines lead to cross-linked polymers which possess decreased water-solubility and storage-stability.

The polymer product of the present invention is employed in the manufacture of wet-strength paper by forming an aqueous suspension of cellulose papermaking fibers, preferably having an alkaline pH, adding to the suspension an effective amount of the polymer of the purpose, stirring the suspension briefly to permit the polymer to become adsorbed by the fibers, forming the suspension of fibers into a wet web, and drying the web ¼ to 4 minutes at 190° F.–250° F. If preferred, the polymer may be applied to a preformed web, by the tub method. In general, between 0.1 to 3% of the polymer based on the dry weight of the fibers gives useful wet strength. The polymer is employed as flocculant by adding a small amount (well diluted) to the suspension to be flocculated, which preferably should have an alkaline (8–10) pH.

The invention is further described by the examples which follow, which are best embodiments of the invention and are not to be regarded as limitations thereon.

EXAMPLE 1

The following illustrates the wet strengthening properties of the product of the present invention in comparison with the wet strength possessed by the parent polyvinylimidazoline, the epichlorohydrin reaction product of polyvinylimidazoline, and hydrolyzed polyvinylimidazoline.

(1) Preparation of polyvinylimidazoline

To 150 g. of ethylenediamine (2.5 mols) at 80° C. is added 79.5 g. (1.5 mols) of finely divided polyacrylonitrile (M.W. approximately 10,000, prepared by polymerizing acrylonitrile in isopropyl alcohol in the presence of ammonium persulfate at reflux) and 1.0 ml. of carbon disulfide as catalyst. The mixture is heated at 95°– 100° C. for six hours with stirring. The resulting thick solution is diluted with 35 ml. of benzene, cooled to 60° C., poured into 500 ml. of benzene and intensively agitated for a few minutes in a Waring Blendor. The recovered spherical particles of polyvinylimidazoline are reagitated with hexane in the blender. The hexane is then filtered off and the residue (polyvinylimidazoline of practically zero nitrile content) is dried under vacuum.

(2) Preparation of epichlorohydrin derivative of polyvinylimidazoline

To 25 g. of polyvinylimidazoline in 100 g. of water is added 30 g. of epichlorohydrin and the solution is stirred and maintained at 85° C. until the odor of epichlorohydrin has disappeared. The reaction mixture becomes clear. The temperature is then reduced to 60° C. sufficiently slowly so that the solution remains clear. The solution at this point has a viscosity of B on the Gardner-Holdt scale at 25° C. The solution is maintained at 60° C. until its viscosity increases to a point just short of gelation (as determined from a pilot run). The solution is then acidified to pH 4.0 with hydrochloric acid and diluted to 8% solids with cold water. The resulting polymer forms an insoluble film when flowed upon glass and heated 1 minute at 90° C. and pH 7.

(3) Preparation of hydrolyzed polyvinylimidazoline

A solution of 75 g. of polyvinylimidazoline (prepared as described above) in 300 g. of water is slowly stirred at 70° C. for seven hours, during which time 80%–100% of the imidazoline substituents are hydrolyzed or hydrated. The product is substantially poly(2-aminoethyl) acrylamide.

(4) Preparation of the epichlorohydrin derivative of hydrolyzed polyvinylimidazoline To 25 g. of the solution of poly(2-aminoethyl)acrylamide (prepared above) is added 50 g. of water and 11.7 g. (0.13 mol) of epichlorohydrin. The epichlorohydrin is reacted as described above. The product is thermosetting when tested as described above.

EXAMPLE 2

The following illustrates the manufacture of wet-strength paper by the beater addition method showing the comparative effectiveness of the polymer of Example 1.

An aqueous suspension of a 50:50 mixture of well-beaten papermaking hardwood/softwood pulp at 0.6% consistency and pH 7 is prepared, and aliquots are taken to which are added sufficient of 1% solutions of the polymers of Example 1 to provide 0.5% of polymer based on the dry weight of the fibers. The aliquots are briefly stirred to permit adsorption of the polymers by the fibers. The fibers are sheeted on a laboratory handsheet machine at 70 lb. basis weight per 25" x 40"/500 ream, and the sheets are dried for one minute on a rotary drum drier having a drum temperature of 240° F. The sheets are then allowed to age for 24 hours at 73° F. and 50% relative humidity, and their wet-strength is determined. Results are as follows:

| Run No. | Polymer added | Paper wet strength, lb./in. |
|---|---|---|
| 1 | Polyvinylimidazoline | 1.0 |
| 2 | ......do.[1] | 2.2 |
| 3 | Hydrolized polyvinylimidazoline [poly(N 2-aminoethyl)acrylamide]. | 1.4 |
| 4 | ......do.[1] | 4.75 |

[1] Epichlorohydrin reacted.

The wet strength developed by the epichlorohydrin-reacted poly(N-2-aminoethyl)acrylamide is about 90% of the wet strength imparted under the same conditions by the adipic acid diethylene-triamine-epichlorohydrin polymer of Keim U.S. Pat. No. 2,926,154, which is now the U.S. industry standard.

EXAMPLE 3

The following illustrates the preparation of a condensation product according to the present invention from high-molecular weight substantially straight chain poly(N-2-aminoethyl)acrylamide and its use as a flocculant for the suspended solids in sewage.

The polymer is prepared by repeating the procedure of Example 1, except that the starting polyacrylonitrile has a molecular weight of about 1,000,000.

To 1,000 cc. of laboratory standard digested sewage at pH 7 in a graduated cylinder containing 2.5% by weight of suspended organic solids is added 0.25 g. of the polymer of Example 3 as a 1% solution at pH 7. The suspension is greatly stirred to distribute the polymer through the body of the liquid. The solids flocculate and settle rapidly.

EXAMPLE 4

The following illustrates the effectiveness of the polymer of Example 3 as a drainage aid in the manufacture of paper.

Two aliquots are removed from a master batch of bleached sulfite pulp beaten to a Canadian standard freeness of 200 ml. The aliquots are adjusted to pH 6 and a consistency of 0.6%. To one (A) is added sufficient of a 1% aqueous solution of the polymer of Example 3 at pH 8 to provide amounts of polymer based on the dry weight of the fibers. To the other (B) is added an equal amount of water at pH 8. The freeness of the samples are determined by the Canadian standard method as follows:

| Aliquot Desig. | Percent polymer | Freeness, ml. |
|---|---|---|
| A | [1] None | 200 |
| B | 0.025 | 227 |
| | 0.075 | 245 |
| | 0.100 | 250 |
| | 0.150 | 240 |
| | 0.250 | 240 |

[1] Control.

I claim:

1. A process for preparing an aqueous solution of a cationic thermosetting resin of high cationic density which comprises hydrolyzing at least ¾ of the imidazoline substituents of a water-soluble cationic polyvinylimidazoline at least 80 mol percent composed of vinylimidazoline linkages, and reacting the resulting polymer in aqueous medium with 1.3 to 1.8 mol of epichlorohydrin per basic amino substituent present to form an aqueous solution of a water-soluble cationic thermosetting resin.

2. A process according to claim 1 wherein the molecular weight of the polyvinylimidazoline is outside the range 100,000–1,000,000.

3. A process according to claim 1 wherein substantially all of the imidazoline substituents of the polyvinylimidazoline are hydrolyzed.

4. A process according to claim 1 wherein the reaction between the hydrolyzed polyvinylimidazoline and the epichlorohydrin is continued to the point of incipient gelation.

5. A process for preparing an aqueous solution of a cationic thermosetting resin of high cationic density, which comprises substantially completely reacting polyacrylonitrile with ethylenediamine thereby forming a polyvinylimidazoline at least 80 mol percent composed of vinylimidazoline linkages, hydrolyzing said polyimiadzoline and reacting the hydrolyzed polyimidazoline with epichlorohydrin by the method of claim 1.

6. The water-soluble cationic thermosetting reaction product of a vinyl polymer consisting essentially of at least 75 mole percent of

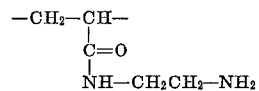

linkages with about 1.3 to 1.8 mol of epichlorohydrin per basic amino nitrogen atom present, wherein substantially all of any other linkages present are vinylimidazoline and acrylonitrile linkages.

7. The water soluble cationic thermosetting reaction product of a vinyl polymer consisting essentially of

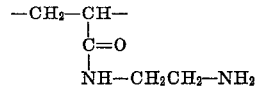

linkages with about 1.3 to 1.8 mol of epichlorohydrin per basic amino nitrogen present.

References Cited

UNITED STATES PATENTS

| | | |
|---|---|---|
| 3,488,720 | 1/1970 | Nagy et al. |
| 3,507,847 | 4/1970 | Williams et al. |

MELVIN GOLDSTEIN, Primary Examiner

U.S. Cl. X.R.

162—168; 210—54; 260—88.3, 88.7N, 89.7 N

UNITED STATES PATENT OFFICE
CERTIFICATE OF CORRECTION 22,041

Patent No. 3,640,936      Dated February 8, 1972

Inventor(s) Laurence Lyman Williams

It is certified that error appears in the above-identified patent and that said Letters Patent are hereby corrected as shown below:

Column 2 line 49 "complete" should read -- completion --.
Column 3 line 46 "of" (second occurrence) should read -- for --;
Column 3 line 52 "to" should read -- and --.

Column 5 line 14 "greatly" should read -- gently --.
Column 6 line 16 "polyimiadzo-" should read -- polyimidazo- --.

Signed and sealed this 8th day of August 1972.

(SEAL)
Attest:

EDWARD M. FLETCHER, JR.       ROBERT GOTTSCHALK
Attesting Officer      Commissioner of Patents